Patented Aug. 8, 1939

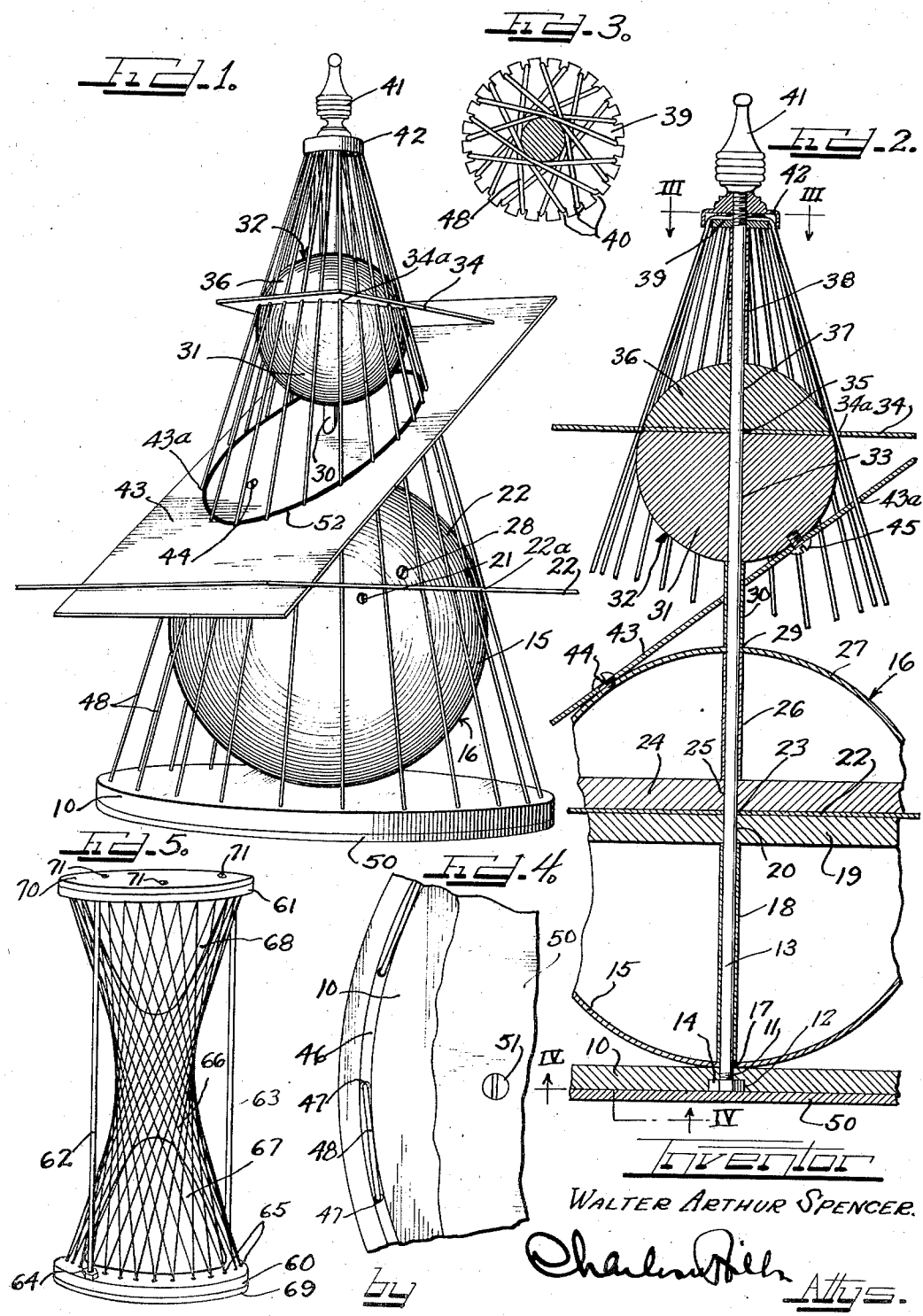

2,168,634

UNITED STATES PATENT OFFICE 2,168,634

GEOMETRIC MODEL

Walter Arthur Spencer, Chicago, Ill.

Application July 29, 1937, Serial No. 156,294

3 Claims. (Cl. 35—34)

This invention relates to models for visual education and more specifically relates to the construction of geometric models.

In the teaching of many subjects, the student must be trained in space vision. In many instances it is difficult for the student to visualize a three dimensional figure from a two dimensional diagram in a textbook. Photographs of three dimensional models are helpful but often result in a distortioned view that obscures rather than clarifies space vision.

It is therefore obvious that the best training in space imagination is available from a first hand inspection of the actual model of the device.

It is then, an object of this invention, to standardize constructions of many geometric models.

A further object of this invention is to provide durable, neat and accurate models for visual education that do not confuse the student because of mechanical constructions visible to the student.

A further object of this invention is to provide an improved, rigid, geometric model having confusing mechanical structure hidden from view.

Other and further objects of this invention will become apparent to those skilled in the art from the following detailed description of the annexed sheet of drawings which discloses several embodiments of the invention. It should be understood, however, that the invention is not limited to the several models illustrated but is applicable to the construction of many other geometric models for visual education.

On the drawing:

Figure 1 is an isometric view of a geometric model according to this invention.

Figure 2 is a vertical cross-sectional view taken axially through the model shown in Figure 1.

Figure 3 is an enlarged horizontal cross-sectional view taken along the line III—III of Figure 2.

Figure 4 is a fragmentary view taken along the line IV—IV of Figure 2.

Figure 5 is an isometric view of another form of geometric model according to this invention.

As shown on the drawing:

In Figures 1 and 2 the reference numeral 10 designates a disk of wood, masonite, molded plastic or the like material forming the base of the model illustrated. The disk 10 has a bore 11 through the center thereof as shown in Figure 2. The bore 11 is countersunk at the bottom as at 12.

A rod 13 extends through the bore 11 and a nut 14 may be threaded on the bottom of the rod and seated in the countersunk portion of the bore as is shown. Obviously a head integral with the rod could be used in place of the nut 14.

The lower segment 15 of a hollow sphere designated generally by the reference numeral 16 has a hole 17 through the bottom thereof as shown in Figure 2 for receiving the rod 13 therethrough.

A sleeve 18 is disposed around the rod 13 within the segment 15. The sleeve 18 is larger than the hole 17 of the segment 15 and abuts the segment.

A disk 19 of wood, masonite or molded plastic has a hole 20 through the center thereof for receiving the rod 13 therethrough. The disk 19 rests on top of the sleeve 18 and is held in the segment 15 by means of screws or the like fastening devices 21 as shown in Figure 1.

A rectangular rigid sheet or board 22 of plastic material, Celluloid, glazed paperboard or the like, has a hole 23 for receiving the rod 13 therethrough. The sheet 22 is disposed on top of the disk 19 and extends beyond the circumference of the ball member 16.

A second disk 24 is disposed on top of the sheet 22. The disk 24 has a hole 25 through the center thereof for receiving the rod 13 therethrough.

A second sleeve 26 is disposed around the rod 13 above the disk 24 and the top segment 27 of the sphere 16 is disposed over the disk and secured thereto by means of screws such as 28 as shown in Fig. 1. The segment 27 has a hole 29 in the top thereof for receiving the rod 13 therethrough.

The sleeves 18 and 26, disposed around the rod 13, hold the sphere 16 in fixed relation on the rod and at the same time reinforce the interior of the hollow sphere against collapse.

A third sleeve 30 is disposed around the rod 13 above the segment 27 of the sphere 16 and abuts the segment 27.

The lower segment 31 of a solid smaller sphere 32 has a bore 33 therethrough and is disposed around the rod 13 above the sleeve 30. The sleeve 30 holds the segment 31 in spaced relation above the sphere 16.

A second sheet or board 34 has a hole 35 therethrough for receiving the rod 13 and is disposed on the segment 31 as shown in Figure 2.

The top segment 36 of the sphere 32 has a hole 37 therethrough for receiving the rod 13 and is disposed on top of the sheet 34.

A fourth sleeve 38 is disposed around the rod 13 above the segment 36 of the sphere 32 and abuts this segment.

A metal disk 39 is disposed around the top portion of the rod 13 and rests on top of the sleeve 38. As best shown in Figure 3, the disk 39 has a plurality of equally spaced notches 40 formed in the periphery thereof for the purpose to be hereinafter described.

An ornamental cover 41 is threaded on the top of the rod 13. The cover 41 has an integral annular flange 42 adapted to circumscribe the disk 39.

A third rigid sheet 43 bisects opposite ends of the sheets 22 and 34 as best shown in Figure 1. For example, the sheet 34 can pass through a slot formed in the upper edge of the sheet 43 while the sheet 43 can pass through a slot formed in the sheet 22. The sheet 43 is secured to the segment 27 of the sphere 16 by means of a bolt 44 tapped into the segment 27. Likewise, the sheet 43 can be secured to the lower segment 31 of the sphere 32 by means of a bolt 45 threaded into the segment 31.

From the above description, it should be understood that the single rod 13 supports the spheres and sheets representing planes from the single base 10 while the various sleeves hold the members on the rod in proper spaced relation.

A single piece of strand material is laced between the disk 39 and the base 10 of the model to form the outline of a cone. As best shown in Figure 4, the base 10 has an annular groove 46 formed in the bottom thereof in spaced relation from its outer periphery. Small holes 47 are drilled through the base or disk 10 in communication with the groove 46.

Strand material 48 such as cat gut, string, wire, or the like material is threaded through the holes 47 and over the disk 39. The strand material 48 is hooked in the grooves or slots 40 formed in the disk 39 and is so threaded as to pass from one side of the disk over the top thereof to a notch or groove 40 on the other side thereof as best shown in Figure 3. The notches 40 are aligned with the holes 47 in the base 10 so that the strands 48 between the top disk and the base will converge symmetrically to outline a cone.

The strand material 48 passes through holes 22a, 34a and 43a provided in the sheets 22, 34 and 43. These holes are aligned with the holes 47 in the base 10 and the notches 40 in the disk 39.

In stringing the strand material to define the cone one end thereof may be knotted while the other end is threaded through a hole 47 to pull the knot into the groove 46. The free end is then threaded over the disk 39 to the opposite side thereof and downward to the base 10 where it is looped under the base as shown in Figure 4 with the looped portion disposed in the groove 46. This manner of threading the model makes possible the use of a single piece of strand material and greatly simplifies the construction.

The flange member 42 covers the strand material 48 looped over the disk 39 and the ornamental cover 41 tapers to a point so as to continue the continuity of the cone defined by the strand material.

A covering member or disk 50 as best shown in Figures 2 and 4 is secured onto the bottom of the base 10 by means of screws such as 51. This covering member 50 provides a smooth base for the model and is coextensive with the base so as to cover the looped strand material in the groove 46 in the base.

The figure defined by the intersection of the sloping sheet 43 with the cone outlined by the strand material 48 can be marked on the sheet 43 as shown at 52, thereby clearly outlining the curve or figure obtained by the intersection of the plane defined by the sheet 43 with the cone defined by the strand material 48.

In the modification illustrated in Figure 5, disks 60 and 61 of rigid material such as wood, molded plastic or the like material receive the ends of rods 62 and 63 therethrough on diametrically opposed sides thereof. The rods 62 and 63 are seated in countersunk bores similar to the bore 11 defined in Figure 2. Nuts may be threaded on the ends of the rods in a countersunk portion of the bores in the same manner in which nut 14 is secured on the rod 13 in the countersunk portion 12 of the bore 11 of the structure in Figure 2.

The disks 60 and 61 are held in spaced relation by nuts such as 64 threaded on the rods 62 and 63 against the facing sides of the disks. Instead of nuts 64, sleeves such as 18 can be disposed around the rods 62 and 63 to hold the disks 60 and 61 in spaced relation.

The disks have a plurality of holes such as 65 therethrough near their outer peripheries and strand material 66 is threaded betwen the disks through the holes 65 to define the desired geometric figure. The disks may be provided with annular grooves such as the groove 46 of the disk 10 described in the modification shown in Figure 4.

Plaster of Paris or dental impression plaster castings 67 and 68 are supported respectively on the disks 60 and 61 to define hyperboloids, paraboloids or other mathematical surfaces within the figure defined by the strand material 66.

Cover disks 69 and 70 are secured to the disks 60 and 61 respectively to cover the strand material looped around the disks and to hide the construction of the model from view. These cover disks 69 and 70 can be secured to the disks 60 and 61 by means of screws such as 71.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A geometric model comprising a disk-like base having a countersunk bore through the center thereof and an annular groove formed in the bottom thereof in spaced relation from the periphery of the disk, a metal rod extending through the bore and having a head seated in the countersunk part of the bore, a spherical member disposed around said rod above the base, said spherical member being formed of two segments, a sheet member disposed between the segments and projecting from the spherical member, a sleeve disposed around the rod abutting the top of the spherical member, a second spherical member disposed around the rod on top of said sleeve, said second spherical member being formed in two segments, a rigid sheet disposed between the segments and projecting therefrom, a second sleeve disposed around the rod above said second spherical member, a disk supported on said sleeve around the top portion of the rod, strand material laced between the disks and the base to define the outline of a cone, cover devices for the base and the disks and a third rigid sheet disposed around the rod between the spherical members thereon and secured to said spherical members, said third sheet intersecting the first and second sheets.

2. A device for visual education comprising a base having a central countersunk bore therethrough, a rod extending through said bore having a head portion engaging the base, a support receiving the top portion of the rod, strand material laced between the support and base over the top of the support and under the bottom of the base, covering members disposed over the support and under the base to cover the strand material, a member disposed around said rod and extending at least to each run of said strand material between the base and support, to define in cooperation with said runs the outline of a geometric figure, and means disposed around said rod for holding said support and said member in spaced relation from each other and from the base.

3. A geometric model comprising a circular base having a countersunk bore through the center portion thereof, an annular groove in the bottom of the base in spaced relation from the outer periphery thereof, said base having a plurality of vertical holes therethrough communicating with said annular groove, a rod extending upwardly from said base and having a head portion seated in said bore, a disk having a notched periphery disposed around said rod near the top thereof, said disk being smaller than said base, strand material threaded through said holes and laced through the notches of said disk for defining the outline of a cone, a cover member disposed over the disk, a second cover member mounted under the base, a spherical member disposed around said rod and extending laterally at least to said strand material to define in cooperation with the latter the outline of a geometric figure, and sleeves surrounding the rod for holding the spherical member and the disk in spaced relation from each other and from the base.

WALTER ARTHUR SPENCER.